United States Patent [19]
Edholm et al.

[11] 3,748,487
[45] July 24, 1973

[54] RADIATION ABSORBING DEVICE FOR RADIOGRAPHIC APPARATUSES

[75] Inventors: Paul Ragnvald Edholm, Linkoping; Nils Bertil Jacobson, Solna, both of Sweden

[73] Assignee: Medinova AB, Solna, Sweden

[22] Filed: Feb. 5, 1971

[21] Appl. No.: 113,013

[30] Foreign Application Priority Data
Feb. 9, 1970 Sweden .............................. 1651/70

[52] U.S. Cl .......................................... 250/512
[51] Int. Cl. ............................................. H05g 3/00
[58] Field of Search ............... 250/86, 108 FS, 65 R

[56] References Cited
UNITED STATES PATENTS
2,405,444 8/1946 Moreau ................................... 56/86

Primary Examiner—James W. Lawrence
Assistant Examiner—C. E. Church
Attorney—Hane, Baxley & Spiecens

[57] ABSTRACT

The invention concerns a radiation absorbing device adapted to be used as a compensating filter device in radiographic apparatuses for reducing the variations in average exposure in different portions of the radiograph, whereby a substantially uniform image contrast all over the radiograph is produced. The radiation absorbing device consists of two or several bodies of a radiation absorbing material, which are coupled to each other through flexible joints so that the shape of the radiation abosrbing device can be varied and adapted to the size, shape and contour of the object being radiographed. The flexible joints between the absorption bodies are of a special design so as to produce no sharp discontinuities in the radiation absorption of the device, which might create false shadow images on the radiograph.

11 Claims, 6 Drawing Figures

INVENTORS
PAUL RAGNVALD EDHOLM
NILS BERTIL JACOBSON

INVENTORS
PAUL RAGNVALD EDHOLM
NILS BERTIL JACOBSON

BY  Hanes Baxley and Spiecens

ATTORNEYS

RADIATION ABSORBING DEVICE FOR RADIOGRAPHIC APPARATUSES

The present invention is related to a radiation absorbing filter device adapted to be used in radiographic apparatuses for equalizing the average exposure in the image plane of the apparatus so that the average exposure is made substantially constant over the entire surface area of the image recording medium used for the radiography.

A radiographic apparatus comprises, as well known in the art, as its fundamental components a source of an ionizing radiation, normally an X-ray tube, an object plane in which the object to be radiographed is positioned, and an image plane on the opposite side of the object plane relative to the radiation source, in which image plane an image recording medium or device is disposed. The image recording medium may be a film sensitive to the ionizing radiation, a fluorescent display screen or an electronic image amplifier. An important problem in radiography apparatuses resides therein that the average intensity in different portions of the radiation beam leaving the object being radiographed and thus the average exposure of the corresponding different portions of the image recording medium may display very large differences caused by differences in thickness, density and absorption properties in different portions of the object. Due to this it is often impossible to obtain an exposure within the prescribed range of the image recording medium, the so called exposure latitude, over the entire area of the image recording medium. Thus, certain portions or areas of the radiograph may be overexposed, whereas other areas may be underexposed, wherefore in these areas the image contrast becomes too small to give the desired and necessary information on the corresponding portions of the object being radiographed.

In order to overcome this problem it has been suggested in the art to modify the radiation by means of absorption filter means disposed in the radiation path between the radiation source and the object plane in such a manner that the average intensity of the radiation in different portions of the image plane and thus the average exposure of different areas of the image recording medium is equalized and made substantially constant over the entire image plane. This technique is schematically illustrated in FIG. 1 in the enclosed drawing. FIG. 1 illustrates schematically a radiographic apparatus comprising a source 1 of ionizing radiation, generally consisting of an X-ray tube, an object plane 2 containing the object 3 to be radiographed and an image plane 4 containing the image recording medium 5 used for the radiography. In the illustrated example the image recording medium consists of a film sensitive to the ionizing radiation. The ionizing radiation beam emitted by the radiation source 1 and used for the radiographic exposure of the object 3 is schematically indicated by dashed lines 6. As schematically illustrated it is assumed that the object 3 to be radiographed displays very large variations in thickness, density and absorption properties. Therefore, the radiation beam would after its passage through the object 3 normally display very large variations in the average intensity in different parts of the image plane 4, which would cause large variations in the average exposure of the different parts of the film 5, whereby some parts of the film would be overexposed whereas other parts might be underexposed. In order to prevent this a radiation absorbing filter device is inserted in the radiation path of the radiation beam 6 between the radiation source 1 and the object plane 2. Fundamentally, this absorption filter device consists of one or several bodies 7 of a radiation absorbing material, which have a varying thickness in the direction of radiation and thus a varying absorption and such a shape and position relative the radiation beam 6 that their absorption of different portions of the radiation beam 6 is generally inversely proportional to the absorption of the same portion of the radiation beam in the object 3 being radiographed. In this way it is theoretically and also practically possible to obtain an equalization of the intensity variations in the radiation beam which leaves the object 3 and exposes the film 5. It is appreciated, however, that it must be possible to adapt the shadowing effect of the absorption body or bodies 7 to the size and shape of the object to be radiographed, for instance the abdomen of a patient, a shoulder or a thigh. In order to achieve this it must obviously be possible to vary the shape of the absorption bodies dependent on the size and shape of the object to be radiographed. It is important that this variation of the shape of the absorption body does not cause any sharp discontinuities in the shadowing effect of the absorption bodies, as such discontinuities may produce false shadows on the radiograph.

An object of the present invention is therefore to provide a radiation absorbing device for the above mentioned purpose, the shape of which can be varied and adapted to the shape and contour of the object to be radiographed without any sharp discontinuities in the radiation absorption of the device being produced due to the variation of the shape of the device.

For this object the radiation absorbing device according to the invention is characterized in that it consists of at least two bodies of a radiation absorbing material, which are connected to each other by means of a flexible joint in such a manner that the bodies can be pivoted to varying positions relative to each other and to the radiation beam, preferably about pivot axes substantially parallel to the direction of radiation. The two absorption bodies are preferably coupled to a common coupling member so as to be pivoted in said coupling member about individual pivot axes, which are parallel and spaced from each other, in such a manner that the two bodies overlap each other in the region between their pivot axes. A third body of radiation absorbing material is preferably disposed to overlap said overlapping portions of said two first-mentioned absorption bodies. Said third absorption body may preferably be given such a shape that the total absorption in said third absorption body and in said overlapping portions of said two first-mentioned absorption bodies for a radiation which is substantially parallel to the pivot axes of said first absorption bodies, is substantially identical to the radiation absorption in other portions of said first absorption bodies and remains unaffected at rotation of said first absorption bodies about their pivot axes in the coupling member. In this way a flexible joint is obtained between the two first-mentioned absorption bodies, which joint does not cause any sharp discontinuities in the radiation absorption of the device.

In the following the invention will be further described with reference to the accompanying drawing, in which FIG. 1 illustrates schematically a radiographic apparatus as described in the foregoing;

Figure 1:
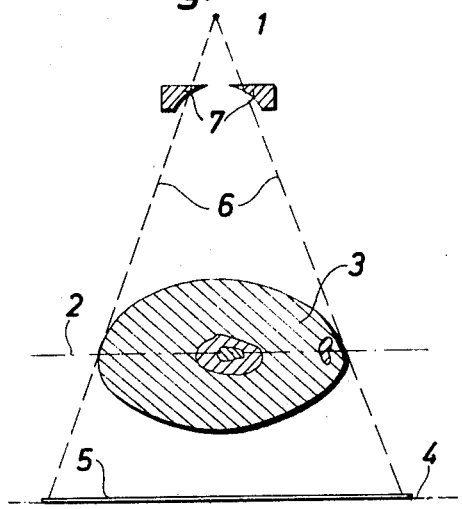
Figure 2:
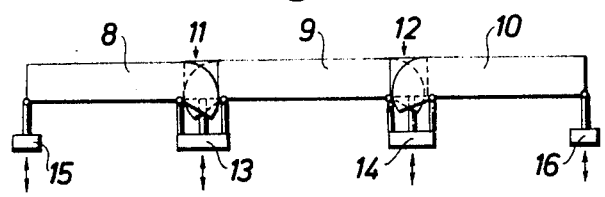
FIG. 2 shows schematically in plan view and by way of example an embodiment of a device according to the invention comprising three elongate absorption bodies coupled to each other through flexible joints.
Figure 3:
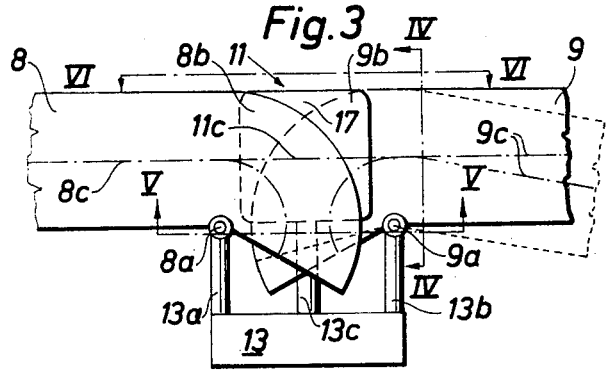
FIG. 3 shows in plan view and on a larger scale the flexible joint between two absorption bodies in the device illustrated in FIG. 2.

The radiation absorbing device according to the invention illustrated by way of example in FIG. 2 comprises three elongate, substantially straight bodies 8, 9 and 10 of a radiation absorbing material. The device is illustrated in a plane which is substantially perpendicular to the direction of the ionizing radiation. The absorption bodies 8, 9, 10 have a wedge-shaped cross-section in planes perpendicular to their longitudinal direction, whereby for a radiation which is substantially perpendicular to the plane of the drawing the bodies have an absorption which decreases continuously from the one longitudinal edge to the opposite longitudinal edge of the bodies. The absorption bodies 8, 9, 10 are connected to each other through flexible joints 11 and 12 in that the adjacent ends of the bodies are pivoted in coupling members 13 and 14, respectively, the pivot axes of the bodies in these coupling members being perpendicular to the plane of the drawing and consequently substantially parallel to the direction of radiation. Further, the outer ends of the outermost absorption bodies 8 and 10 are pivoted in positioning members 15 and 16, respectively. The coupling members 13 and 14 and the positioning members 15 and 16 are displaceable in a suitable manner not illustrated in detail in the drawing substantially in the directions indicated by arrows, whereby consequently the extension of the absorption device formed by the absorption bodies 8, 9 and 10 can be varied and adapted to the contour and shape of the object to be radiographed.

It is appreciated that the flexible joints 11 and 12 between the absorption bodies 8, 9 and 9, 10, respectively, shall ideally have the same absorption for the radiation as the other portions of the absorption bodies and that the absorption of the flexible joint shall not be changed when the bodies 8, 9, 10 are pivoted relative each other in the joints 11, 12. Thereby it is achieved that the absorption device will appear as a single flexible absorption body having the same absorption properties over its entire length. According to the invention this is achieved in that the flexible joints between the bodies 8, 9 and 9, 10, respectively, are designed in the manner illustrated on a larger scale in FIGS. 3 to 6 for the flexible joint 11 between the bodies 8, 9.

Figure 4:
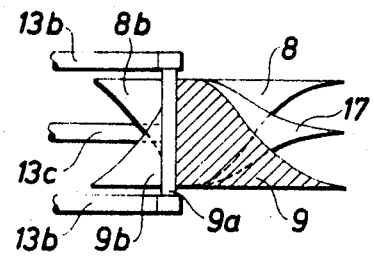
FIG. 4 is a section along the line IV—IV in FIG. 3.
Figure 5:
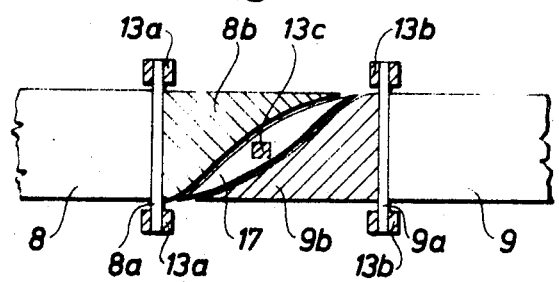
FIG. 5 is a section along the line V—V in FIG. 3.
Figure 6:
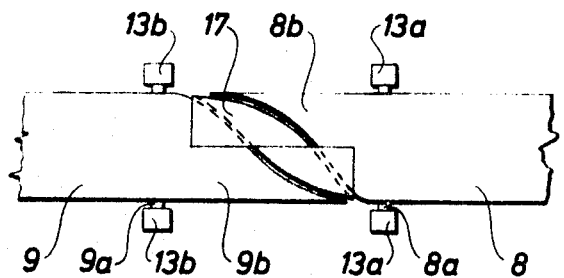
FIG. 6 shows the joint illustrated in FIG. 3 as seen along the line VI—VI.

The bodies 8, 9 have substantially the same wedge-shaped cross-section, which is more clearly seen in FIG. 4. The one side of the wedge-shaped section is substantially straight and substantially perpendicular to the thicker edge of the section, whereas the other side of the wedge-section is S-curved. This cross section, which is perpendicular to the longitudinal direction of the associated body 8 and 9, respectively, is constant over the entire length of the body. At their adjacent ends the bodies 8 and 9 are bent or curved with a constant radius of curvature about the axes of curvature 8a and 9a, respectively, which are perpendicular to the longitudinal directions of the bodies. The curved or bent end portions 8b and 9b, respectively, of the bodies 8 and 9 are completely rotationally symmetric about their axes of curvature 8a and 9a, respectively, and have consequently the same constant cross-section in all planes through the axes of curvature 8a and 9a, respectively. A locus on the absorption body 9 connecting points having the same thickness and thus the same absorption extends consequently in the manner illustrated by way of example with the dash-dot line 9c. The corresponding locus on the absorption body 8 is designated with 8c. The bodies 8, 9 are pivoted about their associated axes of curvature 8a, 9a, respectively, in bracket arms 13a and 13b, respectively, on the coupling member 13 in such reversed positions that the S-curved inclined surfaces on the bent end portions 8b and 9b of the bodies are facing each other. The pivot axes 8a and 9a of the bodies in the coupling member 13 are mutually parallel and substantially parallel to the direction of radiation and spaced from each other so that the bent end portions 8b and 9b of the bodies 8 and 9 overlap. Consequently, each one of the bodies 8 and 9 is free to be pivoted about its pivot axis 8a or 9a, respectively, in the coupling member 13.

The coupling member 13 is provided with an additional bracket arm 13c supporting a third absorption body 17 of a radiation absorbing material in such a manner that said third absorption body 17 is disposed between the overlapping bent end portions 8b and 9b of the absorption bodies 8 and 9, respectively. This additional absorption body 17, which is fixed to the coupling member 13, has such a shape that the total thickness and thus the total absorption of the body 17 and the overlapping bent end portions 8b and 9b of the absorption bodies 8 and 9 perpendicularly to the plane of the drawing, that is in the direction of radiation, is in all points substantially identical to the thickness and thus the absorption in equilocated points on the straight portions of the bodies 8 and 9. Consequently, loci connecting points having the same total absorption for a radiation perpendicular to the plane of drawing extend through the joint 11 in the manner illustrated by way of example with the dash-dot line 11c, which indicates the locus for the same absorption as the loci 8c and 9c on the absorption bodies 8 and 9, respectively. When the two absorption bodies 8 and 9 are in such positions that their longitudinal axes are aligned, they will consequently together with the flexible joint 11 display the same absorption properties as a straight rigid absorption body having the same cross-section as the bodies 8 and 9. It the bodies 8 and 9 are pivoted about their pivot axes 8a and 9a, respectively, in the coupling member 13 so that their longitudinal axes form an oblique angle, this will not affect the absorption properties of the joint 11, as the bent end portions 8b and 9b of the bodies 8 and 9, respectively, are rotationally symmetric about the pivot axes 8a and 9a, respectively. If for instance the body 9 is rotated about its pivot axis 9a to for instance the position indicated by dotted lines in FIG. 3, this will not change the position of extension of the isoabsorption lines for the absorption body 8 and the joint 11 but only the position of the isoabsorption lines for the straight portion of the absorption body 9. In this way discontinuities in the radiation absorption of the device are very effectively prevented. It is appreciated that this is not quite true, if the absorption bodies 8 and 9 are rotated about their pivot axes 8a and 9a, respectively, in the opposite direction so that the straight portions of the absorption bodies 8 and 9, respectively, are moved somewhat into the region covered by the additional absorption body 17. The error and the corresponding distortion of the isoabsorption lines within the joint 11 will be very small, however, and for all practical purposes negligible.

It is appreciated that the required shape of the additional absorption body 17 will depend on the shape of the two pivoted absorption bodies 8 and 9, the radius of curvature of the bent end portions 8b and 9b of these absorption bodies and the distance between their pivot axes 8a and 9a. The required shape of the absorption body 17 may of course in many cases be rather complicated but can rather easily be calculated by means of a computer.

It is also appreciated that a flexible joint between two absorption bodies designed along the principles described in the foregoing and having the properties mentioned in the foregoing can always be achieved independent of the shape of the cross-section of the two pivoted absorption bodies. For certain cross-sections, however, it may be impossible to dispose the two pivoted absorption bodies in substantially the same plane but be necessary to arrange them in mutually spaced planes in order to achieve that their overlapping, bent end portions are free to move independently when the absorption bodies are rotated about their associated pivot axes. However, no serious disadvantages will arise if the two pivoted absorption bodies are disposed in somewhat spaced planes. Further, it may in certain cases be impossible to arrange the stationary absorption body 17 between the two overlapping curved end portions of the pivoted absorption body, in which case the absorption body 17 must instead be arranged either above or underneath the pivoted absorption bodies. Neither this modification causes any serious disadvantages.

It should also be pointed out that in a radiation absorbing device according to FIG. 2 it is of course not necessary that the absorption bodies 8, 9 and 10 be straight between the flexible joints 11 and 12 but that they can just as well be curved in any preferred manner.

In order to obtain a uniform image contrast in all portions of the radiograph, however, the choice of the radiation absorbing substance in the absorption bodies is also important. In the prior art one has generally used absorption bodies of aluminium. This has the disadvantage, however, that those portions of the radiation that pass through thin portions of the object being radiographed and that consequently pass through thick portions of the absorption bodies will be subject to a displacement of the energy distribution spectrum of the radiation towards higher energy values, that is to a harder radiation. Since this harder radiation has a higher penetration in the object being radiographed, the portions of the object having a low absorption, that is generally the thinner portions of the object, will be reproduced with a lower image contrast than the portions of the object having a higher absorption, that is normally the thicker portions of the object. This can be avoided, however, if as radiation absorbing substance in the radiation body one selects a substance having a K-absorption edge located within the energy distribution spectrum of the radiation used for the radiographic exposure and preferably close to the energy value for the intensity maximum of the radiation being used. For X-ray radiation this means that the absorption edge of the radiation absorbing substance shall correspond to an energy, which multiplied with a factor of 1.2 to 2.0, preferably about 1.4, gives the voltage used on the X-ray tube during the radiographic exposure. This value is not critical, however, but the tube voltage may vary within a comparatively wide range without the constrast improvement being lost. The radiation absorbing substance is preferably selected among the rare earth metals, which satisfy the above mentioned condition for tube voltages normally used for radiography of skeleton structures and also for many soft tissue structures.

What we claim is:

1. A filter device for the penetrative radiation in a radiographic apparatus, comprising at least first and second, solid, penetrative radiation absorbing filter bodies, each of said first and second filter bodies having a varying thickness in a direction parallel to the direction of the penetrative radiation to be filtered, and a flexible joint interconnecting said first and second filter bodies so as to permit rotation of either one of said filter bodies independently of the other filter body in a plane substantially perpendicular to the direction of the penetrative radiation to be filtered, said joint including an interconnecting member and said first and second filter bodies being pivoted in said interconnecting member about individual separate pivot axes, said pivot axes being mutually parallel and spaced and substantially parallel to the direction of the penetrative radiation to be filtered and said first and second filter bodies having portions overlapping each other within the region between said spaced pivot axes.

2. A filter device as claimed in claim 1, further comprising a third, solid, penetrative radiation absorbing filter body rigidly attached to said interconnecting member and disposed to overlap said overlapping portions of said first and second filter bodies.

3. A filter device as claimed in claim 1, wherein each of said first and second filter bodies is generally elongate and has substantially the same cross-section in all planes perpendicular to the longitudinal axis of the filter body and one end bent with a constant radius of curvature about an axis of curvature perpendicular to the longitudinal axis of the filter body, said first and second filter bodies being pivoted in said interconnecting member with their said axes of curvature coinciding with their said pivot axes in the interconnecting member and with their said bent end portions overlapping each other.

4. A filter device as claimed in claim 3, wherein said cross-section is substantially identical for both of said first and second filter bodies, and comprising a third, solid, penetrative radiation absorbing filter body rigidly attached to said interconnecting member and disposed to overlap said bent end portions of said first and second filter bodies, said third filter body having such a shape that the total combined absorbing properties of said third filter body and said overlapping bent end portions of said first and second filter bodies for a penetrative radiation which is substantially parallel to the direction of said pivot axes is substantially corresponding to the absorption properties of the non-overlapping portions of said first and second filter bodies for such a penetrative radiation.

5. A filter device as claimed in claim 3, wherein said cross-section of each of said first and second filter bodies respectively is wedge-shaped so that each of said first and second filter bodies has a thickness continuously increasing from one longitudinal edge of the filter body to the opposite longitudinal edge of the filter body, said axes of curvature of said bent end portions of said first and second filter bodies being located adjacent the thicker longitudinal edges of said filter bodies.

6. A filter device as claimed in claim 5, wherein each of said first and second filter bodies has a longitudinal side surface substantially perpendicular to said axis of curvature of said bent end portion of the filter body, and said first and second filter bodies are pivoted in said interconnecting member with their said side surfaces facing in opposite directions.

7. A filter device as claimed in claim 6, wherein said third filter body is disposed between said overlapping bent end portions of said first and second filter bodies.

8. A filter device as claimed in claim 1, wherein said filter bodies consist of a penetrative radiation absorbing material containing at least one element having a K-absorption edge within the energy spectrum of the penetrative radiation to be filtered.

9. A filter device as claimed in claim 8, wherein the K-absorption edge of said radiation absorbing element is located close to the energy value for the intensity maximum of the penetrative radiation to be filtered.

10. A filter device as claimed in claim 8, wherein the K-absorption edge of said radiation absorbing element corresponds to an energy which multiplied with a factor within the range between 1.2 and 2.0 corresponds to the voltage used for an X-ray tube producing the penetrative radiation to be filtered.

11. A filter device as claimed in claim 8, wherein said radiation absorbing element is a rare earth metal.

* * * * *